R. J. BURROWS.
AUTOMOBILE TRUCK.
APPLICATION FILED NOV. 14, 1918.
1,390,757. Patented Sept. 13, 1921.
5 SHEETS—SHEET 1.
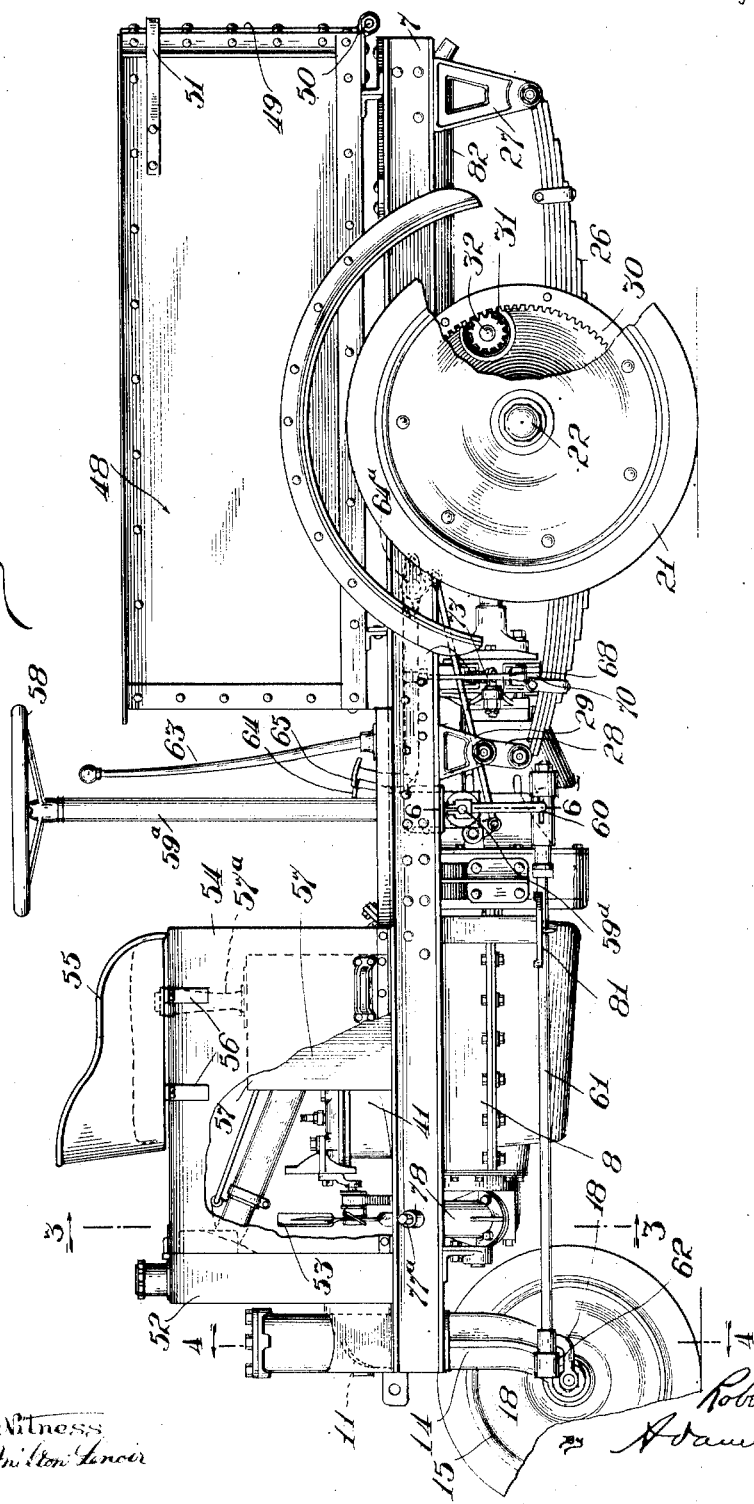

R. J. BURROWS.
AUTOMOBILE TRUCK.
APPLICATION FILED NOV. 14, 1918.
1,390,757. Patented Sept. 13, 1921.
5 SHEETS—SHEET 2.
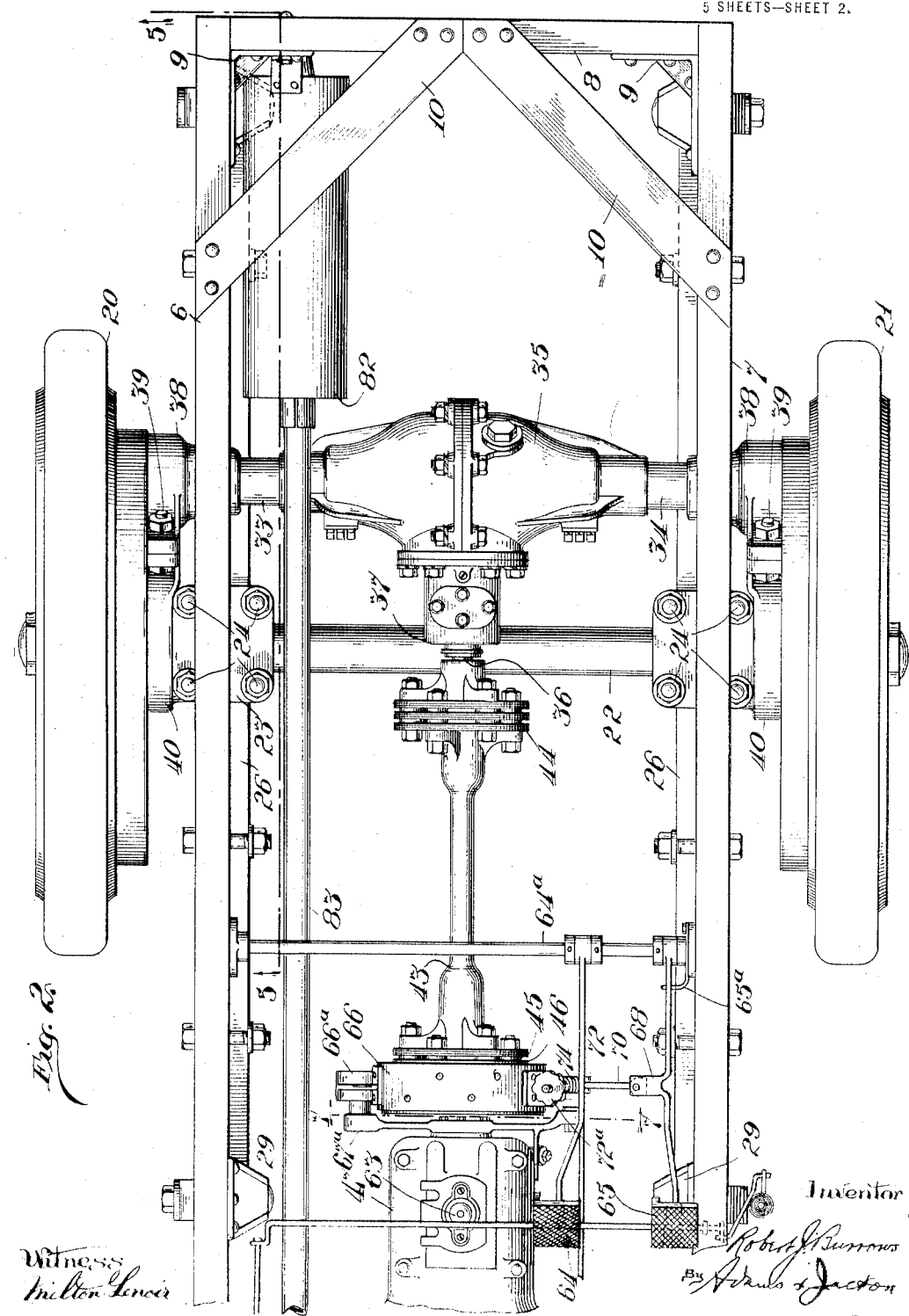

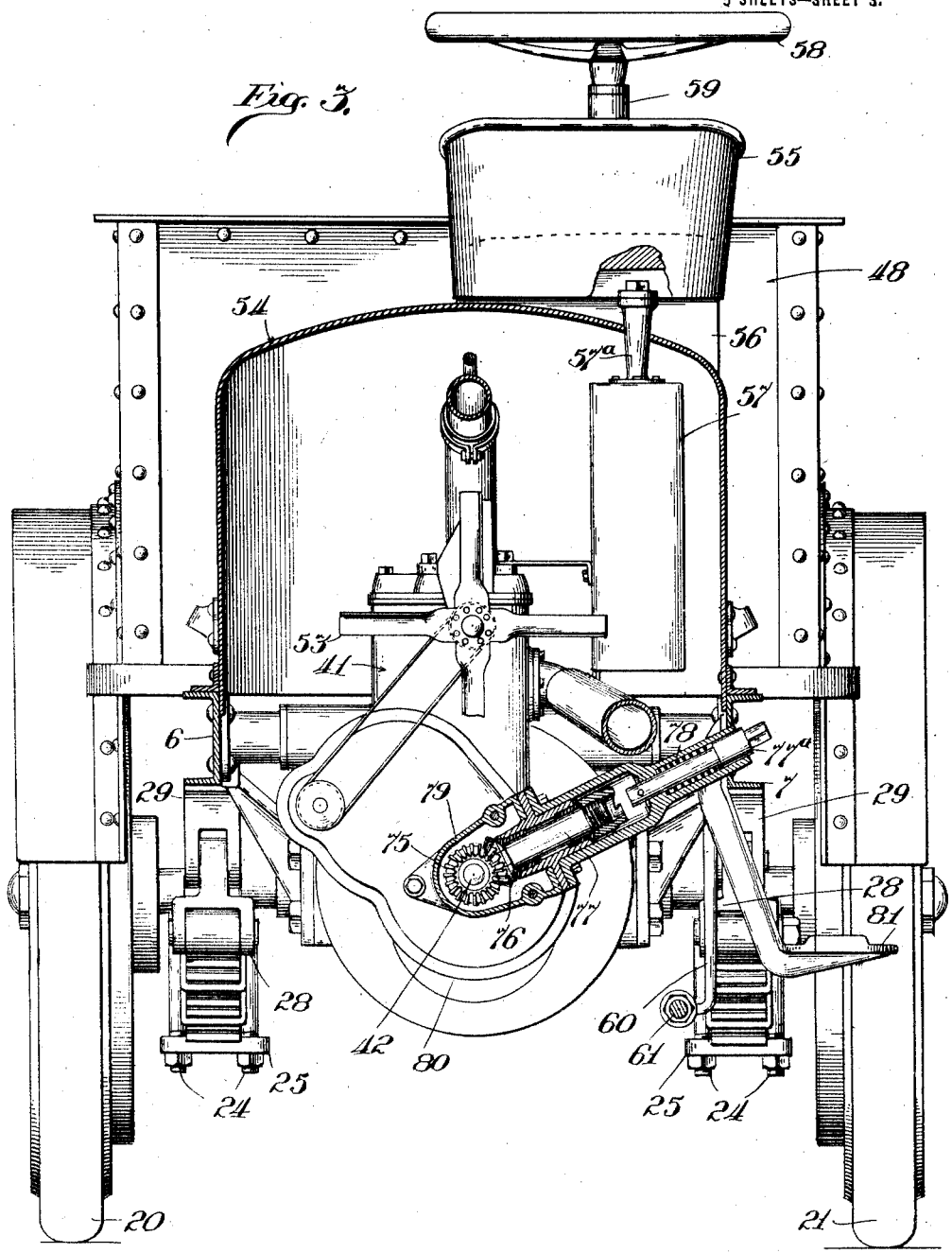

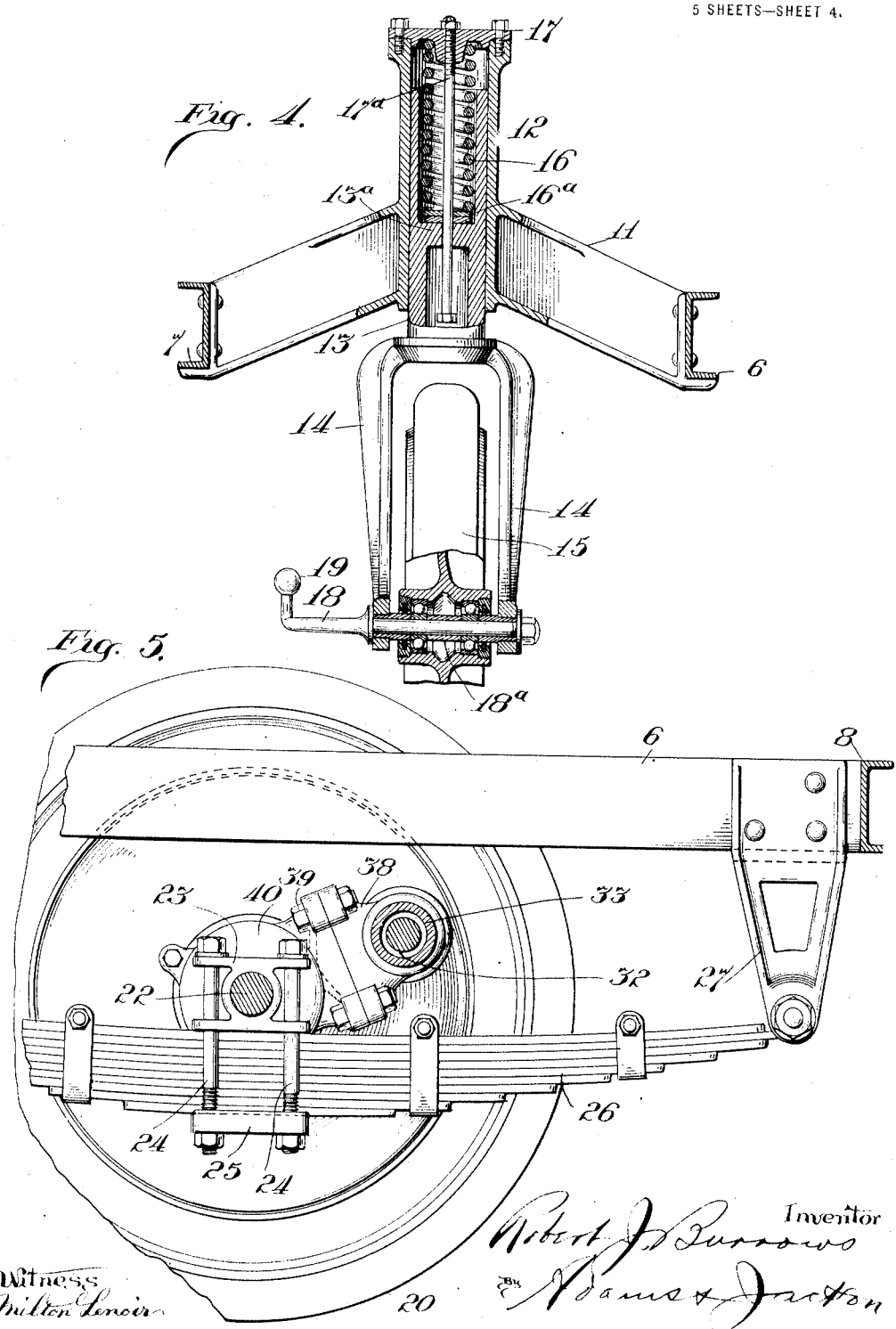

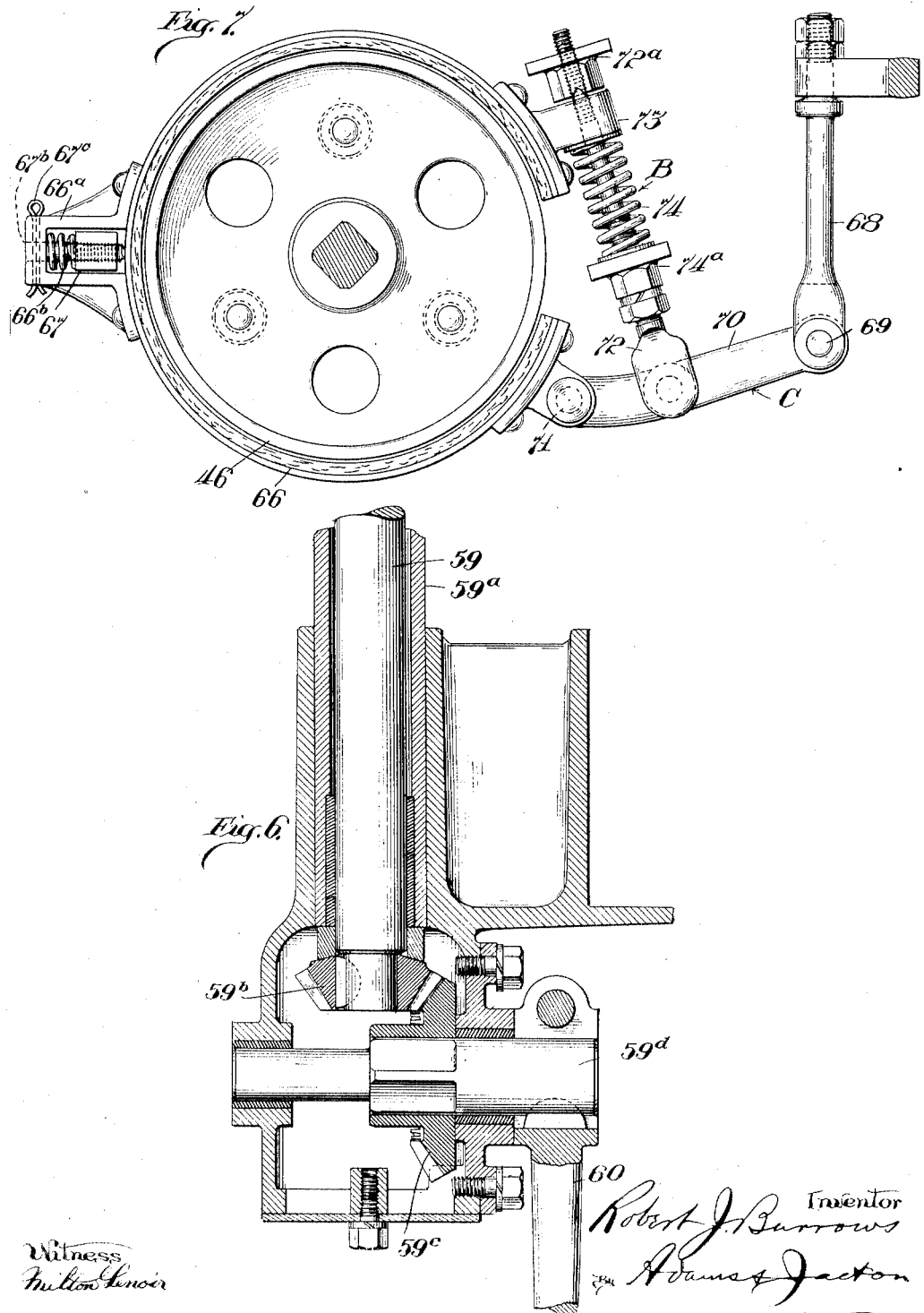

UNITED STATES PATENT OFFICE.

ROBERT J. BURROWS, OF BUCHANAN, MICHIGAN.

AUTOMOBILE-TRUCK.

1,390,757.  Specification of Letters Patent.  Patented Sept. 13, 1921.

Application filed November 14, 1918. Serial No. 262,550.

*To all whom it may concern:*

Be it known that I, ROBERT J. BURROWS, a citizen of the United States, and a resident of Buchanan, in the county of Berrien and State of Michigan, have invented certain new and useful Improvements in Automobile-Trucks, of which the following is a specification, reference being had to the accompanying drawings.

My invention relates to power propelled vehicles and has for its object to provide a truck suitable for use in and about factory buildings for conveying more or less heavy loads not only about the factory grounds but also in the factory buildings. Obviously a truck suitable for such use, which may conveniently be termed an industrial truck, must be of comparatively small dimensions and must be capable of being easily and quickly steered so as to turn sharp corners and dodge obstructions such as machinery, piles of castings and other material, &c. It must also be so constructed that the load may be carried to as near the point of discharge as possible, and the construction of the truck must be such as to give the driver a clear view ahead and around the truck so that he may guide it accurately. It is also highly desirable that the load be carried as low down as possible, and that the power be ample to enable the truck to draw trailers, and to carry heavy loads up steep grades, as is frequently necessary in going from one building to another. All these desirable qualities are realized in the truck which forms the subject-matter of this application, and my invention comprises the various features of construction by which they are attained, as hereinafter pointed out.

In the accompanying drawings:—

Figure 1 is a side elevation of my improved truck, part of one of the front wheels being broken away;

Fig. 2 is an enlarged plan view of the forward portion of the frame of the truck, showing the construction employed for driving the front wheels;

Fig. 3 is a vertical cross-section on line 3—3 of Fig. 1;

Fig. 4 is a vertical cross-section on line 4—4 of Fig. 1, showing the manner in which the rear steering wheel is mounted;

Fig. 5 is a partial longitudinal section on line 5—5 of Fig. 2;

Fig. 6 is a partial vertical section on line 6—6 of Fig. 1; and

Fig. 7 is a partial cross-section on line 7—7 of Fig. 2, showing the brake mechanism.

Referring to the drawings, 6—7 indicate the side bars and 8 the front cross-bar of the frame of the truck, which is rectangular in form, as shown in Fig. 2. The bars 6—7—8 are preferably channel bars and are firmly secured together by any suitable means, such as corner brackets 9 and braces 10, as shown in said figure. At the rear the side bars 6—7 are connected by an inverted Y-shaped bracket 11, (see Fig. 4) the central portion or stem 12 of which is tubular in form and serves as a cylinder to receive a hollow plunger 13 which carries at its lower end a yoke 14 in which is mounted a wheel 15. The latter wheel supports the rear portion of the truck and also serves to steer it. The frame of the truck is cushioned upon the steering wheel 15 by a spring 16 fitted in the plunger 13 and bearing at its upper end against a cap plate 17 secured upon the upper end of the stem 12, and at its lower end upon washers 16ª which rest on an internal flange 13ª in the plunger 13, as shown in Fig. 4. The bracket 11 is normally supported high enough above the yoke 14 so that sufficient longitudinal play is permitted to meet the requirements of ordinary use. A bolt 17ª which extends through the flange 13ª and the cap plate 17 prevents the plunger 13 from falling out of the stem 12 in case the rear end of the frame should be lifted up. 18 indicates a steering arm which projects laterally from the axis of the steering wheel 15 and preferably extends through a sleeve 18ª upon which, as shown in Figs. 1 and 4, said wheel is mounted on anti-friction bearings. The outer end of the arm 18 is provided with a ball 19, as usual, for making a universal joint steering connection, as hereinafter described.

20—21 indicate the front or traction wheels by means of which the truck is propelled. Said wheels are loosely mounted upon the opposite ends of a dead axle 22, as shown in Fig. 2, and are provided with any suitable anti-friction bearings. The dead axle 22 is provided near its opposite ends with brackets 23, as shown in Fig. 5, which carry downwardly extending bolts 24 upon the lower ends of which are mounted spring seats 25. 26 indicates springs which rest upon the spring seats 25 and are clamped against the under sides of the brackets 23 by the bolts 24, as shown in Fig. 5. The forward ends of said springs are connected to depending brackets 27 secured to the side bars 6—7 of the frame, and the rear ends of said springs are connected by shackles 28 with brackets 29 which depend from the side bars 6—7 about midway of their length, as shown in Fig. 1. Thus the frame of the truck is supported comparatively near the ground and consequently the work of loading and unloading the truck is materially reduced.

The wheels 20—21 are provided with internal gears 30, as shown in Fig. 1, with which mesh pinions 31 mounted on jack shafts 32, as shown in said figure, which jack shafts are parallel with the dead axle 22 and are inclosed in sleeves 33—34 which form lateral extensions of the usual differential housing 35, as shown in Fig. 2. The differential contained in the housing 35 is not shown as it may be of any suitable type provided with a stub propeller shaft 36 which extends longitudinally of the truck and is mounted in anti-friction bearings in a supplemental housing 37. The construction I prefer to use is shown in my Letters Patent No. 1,335,040, granted March 30, 1920, but any other suitable construction may be used. The differential housing 35 and the sleeves 33—34 have no intermediate connection with the dead axle member, but the outer end portions of the sleeves 33—34 are connected with the spring supporting brackets 23 so as to transmit the torque strains to the springs. For this purpose the outer end portions of the sleeves 33—34 are connected with the brackets 23 by castings 38 which are detachably connected by bolts 39 with castings 40 integral with or secured to the brackets 23, as shown in Fig. 5. This construction is an adaptation of the construction shown and described in my Letters Patent No. 1,354,462, granted Oct. 5, 1920.

The stub propeller shaft 36 is arranged to be driven by an internal combustion motor 41, shown in Fig. 1, which is mounted on the rear portion of the frame of the machine and drives a crank shaft 42 in the usual way. Said crank shaft extends longitudinally of the machine below the frame thereof, and is provided with the usual clutch member, (not shown). 43 indicates the main propeller shaft, which, as shown in Fig. 2, is connected at its forward end with the stub propeller shaft 36 by a universal joint 44 preferably of the flexible disk type, but which may be of any other suitable type. The rear end of said propeller shaft 43 is connected by a suitable universal joint 45 with a brake drum 46 which is connected through the usual transmission gearing with a clutch member which coöperates with the clutch member on the crank shaft. The transmission gearing, which is not shown as it may be of any suitable type, is inclosed in a housing 47, as shown in Fig. 2. It will be understood that the main propeller shaft 43 may be driven by the engine 41 at a variety of speeds, or may be reversed, by appropriately shifting the transmission gearing, and it may be disconnected from the engine by throwing out the clutch, all according to well understood practice in automobile construction. Detailed description and illustration of these parts, is, therefore, believed to be unnecessary.

48 indicates a load carrying platform in the form of a bed or box which is mounted upon the forward portion of the truck so that it extends a considerable distance in advance of the dead axle member 22, as shown in Fig. 1, the forward end of said box being substantially coincident with the front end of the truck frame. Said box is provided at its front end with a gate 49 hinged at its lower end, as shown at 50 in Fig. 1, so that it may be swung down for conveniently loading or unloading the box. Said gate is normally held in its closed position by spring latches 51 at the sides of the box, as shown in said figure.

52 indicates the radiator of the engine which is mounted upon the rear portion of the main frame, as shown in Fig. 1, and 53 indicates the usual fan driven by the engine 41. 54 indicates a hood which extends over the engine and is supported upon the side bars 6—7 of the frame. Said hood is made strong enough to support the driver's seat 55, which is placed upon it, as shown in said figure, and is secured thereto by straps 56. 57 indicates a gasolene tank which is mounted on the frame of the engine in position to be covered by the hood 54. The tank 57 is filled through a tube 57ª which extends up through the seat 55 and is covered by the cushion thereon, as shown in Fig. 1. 58 indicates the steering wheel which is carried at the upper end of a shaft 59 which rises through a tube or column 59ª mounted on the frame of the machine back of the box 48 and in front of the driver's seat, as shown in Figs. 1 and 6. At its lower end the shaft 59 carries a beveled pinion 59ᵇ which meshes with a beveled gear 59ᶜ mounted on a rock-shaft 59ᵈ, as shown in Fig. 6, and the latter shaft carries an arm 60 which is connected with the arm 18 of the rear wheel 15 by means of a steering rod 61 the rear end of which has a coupling 62 provided with a socket to receive the ball 19. (See Fig. 1.) Obviously by rotating the shaft 59 the rear wheel 15 may be turned in either direction to steer the truck.

63 indicates a gear shifting lever which rises through the frame of the machine within convenient reach of the operator, and is connected with the transmission gearing through any suitable standard devices for the purpose. 64 indicates the usual clutch pedal and 65 indicates the brake pedal, both of which are loosely mounted on a transverse rod 64ª supported by the side bars of the truck frame, as shown in Fig. 2. The brake pedal 65 is arranged to operate a brake band 66 which embraces the drum 46, as shown in Figs. 2 and 7, and is mounted intermediately by means of a yoke 66ª fitted to slide upon a head 67 carried by a bracket 67ª suitably connected with the truck frame, as shown in Fig. 2. A spring 66ᵇ is interposed between the outer portion of the yoke 66ª and the head 67 so as to exert outward pressure on the yoke, and the parts are held in proper relation to each other by a pin 67ᵇ screwed into the head 67 and secured to the yoke 66ª by a cotter pin 67ᶜ, as shown in Fig. 7, the spring 66ᵇ being mounted on said pin. The brake pedal or lever 65 is operatively connected with the ends of the brake band 66 by a connecting rod 68, the upper end of which is secured to the brake lever intermediately thereof, as shown in Figs. 2 and 7, while its lower end is connected by a pivot 69 with the outer end of a lever 70, the inner end of which is connected to the lower end of the brake band by a pivot 71, as shown in Fig. 7. The lever 70 is intermediately connected with the upper end of the brake band by a yoke 72 which extends through a tapered slot in a lug 73 secured to the brake band and is adjustably secured by a nut 72ª screwed upon its upper end. A spring 74 mounted on the yoke 72 tends to move the ends of the brake band apart and release the brake. The action of said spring may be adjusted by means of a nut 74ª screwed upon the yoke, as shown in Fig. 7. It will be apparent that by pressing downward on the brake pedal 65 the brake will be set, and that the spring 74 will release the brake when pressure on the pedal 65 is removed. 65ª indicates a flat spring which is secured to the truck frame and extends under the brake lever 65 to bring said lever back to normal position when the brake is released. It also assists the spring 74 in doing its work.

For the purpose of cranking the engine to start it, the rear end of the crank shaft 42 is provided with a bevel pinion 75 which meshes with a bevel pinion 76 carried at the inner end of a diagonal shaft 77 which extends laterally and is adapted to be engaged and rotated by an endwise movable shaft 77ª which projects through the side bar 7 of the frame of the machine, as shown in Figs. 1 and 3. The shafts 77, 77ª are mounted in suitable bearings in a housing 78, as shown in Fig. 3, and the pinions 75—76 are inclosed in a housing 79 secured to the rear end of the usual crank shaft casing 80, as shown in Fig. 1. To start the engine a crank is applied to the squared outer end of the shaft 77ª, which is always conveniently accessible, and said shaft is moved inward into locking engagement with the shaft 77, the adjoining ends of said shafts having the ratchet clutch devices usually employed for this purpose. By then rotating the shaft 77ª in the proper direction the crank shaft 42 is rotated.

81 indicates a step for the convenience of the driver. 82 indicates a muffler which receives the exhaust from an exhaust pipe 83 in the usual way. Said muffler is preferably located at one side of the front portion of the main frame, as shown in Fig. 2.

It will be noted that as the steering of the truck is controlled by turning the swiveled rear wheel, and as such wheel has a very wide range of angular movement, the truck is adapted for use even in the most confined areas; in fact it may be turned completely about in a space hardly wider than its own length. It is, therefore, well adapted for factory use. Also, as the load is carried at the front end portion of the truck, the driver has a clear view of his course in transporting the load so that he may maneuver the truck to bring its front end exactly to the place where he wishes to unload. The use of the gear drive for the traction wheels provides the requisite power to enable the truck to be used to carry or draw heavy loads under adverse conditions, and the provision of a brake operating in connection with the power transmission mechanism makes it practicable to make the truck narrower without sacrificing its load carrying capacity. It therefore increases its suitability for use in confined places. The driver has a clear view on both sides and behind the truck so that when backing, or swinging the rear end of the truck sharply to one side or the other, he may avoid obstacles that may lie in his way. The mounting of the driver's seat on the hood makes it practicable to shorten the wheel base and thereby enable the truck to be turned in a shorter radius.

What I claim as my invention and desire to secure by Letters Patent, is—

1. An industrial truck comprising a frame, means at the front end portion thereof for supporting the load to be transported, power driven front wheels, a motor mounted on said frame back of said load-supporting means, means operatively connecting the motor with said wheels, ground-engaging steering means at the rear portion of the truck, a driver's seat back of the load-supporting means, and means adjacent to the driver's seat for operating said steering means.

2. An industrial truck comprising a frame, power driven front wheels, means mounted on said frame and extending forward of said front wheels for supporting the load to be transported, a motor mounted on said frame back of said load-supporting means, means operatively connecting the motor with said wheels, ground-engaging steering means at the rear portion of the truck, a driver's seat back of the load-supporting means, and means adjacent to the driver's seat for operating said steering means.

3. An industrial truck comprising a frame, means at the front end portion thereof for supporting the load to be transported, power driven front wheels, a motor mounted on said frame back of said load-supporting means, means operatively connecting the motor with said wheels, a swiveled steering wheel at the rear portion of the truck, a driver's seat back of the load-supporting means, and means adjacent to the driver's seat for operating said steering wheel.

4. An industrial truck comprising a frame, means at the front end portion thereof for supporting the load to be transported, power driven front wheels, a motor mounted on said frame back of said load-supporting means, means operatively connecting the motor with said wheels, a swiveled steering wheel at the rear portion of the truck, said frame being spring supported on said steering wheel, a driver's seat back of the load-supporting means, and means adjacent to the driver's seat for operating said steering wheel.

5. An industrial truck comprising a frame, means at the front end portion thereof for supporting the load to be transported, power driven front wheels, a motor mounted on said frame back of said load supporting means, means operatively connecting the motor with said wheels, ground engaging steering means at the rear portion of the truck, a steering device between the motor and the load-supporting means for operating said steering means, and a driver's seat adjacent to said steering device.

6. An industrial truck comprising a frame, means at the front end portion thereof for supporting the load to be transported, power driven front wheels, a motor mounted on said frame back of said load-supporting means, means operatively connecting the motor with said wheels, ground-engaging steering means at the rear portion of the truck, a driver's seat mounted over said motor, and a steering device between said seat and said load-supporting means.

7. An industrial truck comprising a frame, means at the front end portion thereof for supporting the load to be transported, power driven front wheels, a radiator mounted at the rear portion of the truck, an internal combustion motor mounted on the frame in advance of said radiator, means operatively connecting said motor with said wheels, ground-engaging steering means at the rear portion of the truck, and a driver's seat located between said radiator and said load-supporting means, 8. An industrial truck comprising a frame, means at the front end portion thereof for supporting the load to be transported, a front axle, springs secured to the under side of said axle and supporting said frame, wheels mounted on said axle, a motor mounted on said frame back of said load-supporting means, means operatively connecting the motor with said wheels, ground-engaging steering means at the rear portion of the truck, a driver's seat back of the load-supporting means, and means adjacent to the driver's seat for operating said steering means.

9. An industrial truck comprising a frame, means at the front end portion thereof for supporting the load to be transported, power driven front wheels, a motor mounted on said frame back of said load-supporting means, a power transmission shaft disposed longitudinally of said frame and operatively connecting said motor with said wheels, a brake operating on said shaft, ground-engaging steering means at the rear end portion of the truck, a driver's seat back of the load-supporting means, means adjacent to the driver's seat for operating said steering means, and means adjacent to the driver's seat for operating said brake.

10. A truck comprising a frame, wheels at opposite sides thereof near the front, a box mounted on the front portion of said frame and extending forward from said wheels, a motor mounted on the rear portion of said frame, means operated by said motor for driving said wheels, a steering wheel at the rear of said frame, means back of said box for steering said steering wheel, a hood detachably mounted on the frame and extending over said motor, and a driver's seat carried by said hood.

ROBERT J. BURROWS.